(12) United States Patent
Bongaerts et al.

(10) Patent No.: US 10,524,580 B1
(45) Date of Patent: Jan. 7, 2020

(54) SEATING DEVICES, METHODS, AND ASSEMBLIES

(71) Applicant: Beaufurn, LLC, Advance, NC (US)

(72) Inventors: William I Bongaerts, Winston-Salem, NC (US); Philip Behrens, Winston-Salem, NC (US)

(73) Assignee: Beaufurn, LLC, Advance, NC (US)

( * ) Notice: Subject to any disclaimer, the term of this patent is extended or adjusted under 35 U.S.C. 154(b) by 0 days.

(21) Appl. No.: 15/798,964

(22) Filed: Oct. 31, 2017

Related U.S. Application Data

(60) Provisional application No. 62/415,610, filed on Nov. 1, 2016.

(51) Int. Cl.
| | | |
|---|---|---|
| *A47C 13/00* | (2006.01) | |
| *A47C 7/40* | (2006.01) | |
| *A47C 7/24* | (2006.01) | |
| *F16B 35/06* | (2006.01) | |

(52) U.S. Cl.
CPC .............. *A47C 13/005* (2013.01); *A47C 7/24* (2013.01); *A47C 7/40* (2013.01); *A61H 2201/0149* (2013.01); *F16B 35/06* (2013.01)

(58) Field of Classification Search
CPC ......... A47C 13/005; A47C 4/02; A47C 4/028; A47C 7/42
USPC ............................ 297/440.14, 440.2, 451.8
See application file for complete search history.

(56) References Cited

U.S. PATENT DOCUMENTS

| | | | | |
|---|---|---|---|---|
| 2,960,152 A | * | 11/1960 | Wendel ..................... | A47C 7/18 267/145 |
| 3,747,978 A | * | 7/1973 | Barecki ..................... | A47C 4/02 297/183.8 |
| 3,848,925 A | * | 11/1974 | Harder, Jr. ............... | A47C 3/12 297/283.2 |
| 3,861,747 A | * | 1/1975 | Diamond ............... | A47C 7/024 297/452.14 |
| 5,775,042 A | | 7/1998 | Mowery et al. ................ | 52/520 |
| 7,140,690 B2 | * | 11/2006 | White ....................... | A47C 4/02 297/440.14 |
| 7,575,283 B2 | * | 8/2009 | Crowe ..................... | A47C 4/02 297/158.1 |
| 7,775,009 B2 | | 8/2010 | King .............................. | 52/520 |
| 2004/0155509 A1 | * | 8/2004 | Smith, Jr. ................ | A47C 7/42 297/440.15 |
| 2006/0196147 A1 | | 9/2006 | Dickey ........................ | 52/782.1 |
| 2010/0077676 A1 | | 4/2010 | Dobler ........................ | 52/127.1 |
| 2013/0017013 A1 | * | 1/2013 | Hale ........................ | A47C 4/02 403/327 |

* cited by examiner

*Primary Examiner* — Joanne Silbermann

(74) *Attorney, Agent, or Firm* — MacCord Mason PLLC

(57) ABSTRACT

A seating arrangement may include a rear panel, a back panel adjoining the rear panel, a base box mating with the back panel, a seat supported by the base box, at least one removable back panel segment; and a top cap covering and/or securing the at least one back panel. The seating arrangement may also include a cleat system for adjoining the back panel segments to the back panel.

20 Claims, 17 Drawing Sheets

SEATING DEVICES, METHODS, AND ASSEMBLIES

This application claims the benefit of US provisional application No. 62/415,610, filed Nov. 1, 2016, which is incorporated herein by reference in its entirety.

FIELD OF THE TECHNOLOGY

The present disclosure relates generally to seating, and more particularly to improved modular seating devices, methods, kits and assemblies.

BACKGROUND

It is desirable to provide distinctive, reliable and cost effective seating in businesses for customers to use when frequenting the business facility. Applicant has realized it is often difficult to provide seating that is cost-effective, reliable, convenient and also distinctive and fashionable.

In some instances, booth type seating is the most practical, however, this type of seating in particular is often not available as both fashionable and cost-effective. Seating is often ordered and shipped pre-assembled to the ordering location. Especially with higher-end booth seating, booths arrive at their locations pre-assembled and ready to install. Applicant has found this limiting because much of the more desirable booth seating is either bulky, heavy, and/or both. The shipping costs of pre-assembled booth seating therefor may be prohibitive for many businesses.

Another challenge to providing modular seating that may be shipped and then assembled is that consumers desire ease of assembly, which is often counter to also providing secure and durable seating.

Therefore, Applicants desire alternative cost-effective, improved seating devices, kits, assemblies and methods that are cost-effective, durable, fashionable and accessible at remote locations.

SUMMARY

In accordance with the present disclosure, assemblies, devices, kits and methods are provided for seating that is economical, durable and aesthetically pleasing, and the like. This disclosure, in some embodiments, provides improved seating that is convenient, efficient, durable and more accessible for customers.

In one embodiment of the disclosure is a seating arrangement including a rear panel, a back panel adjoining the rear panel, a base box mating with said back panel, a seat supported by said base box, at least one removable back panel segment; and a top cap covering and/or securing said at least one back panel.

The seating arrangement may include a cleat system. A cleat system, in one example, may include at least two cleats and at least two cleat receptors. There may be at least two cleats and/or two cleat receptors in the system on each back panel segment. The at least two cleats may project from said back panel to correspond to a back panel segment. The at least two cleat receptors may be recessed into openings in said back panel segment. The cleats may be angled cleats. The cleats may have a face having an angle.

A back panel segment may include recesses. The recesses may include an angled edge. The edge may be a chamfered edge. The chamfered edge may mate with that at least two angled cleats.

In some examples, the seating arrangement is configured to be disassembled for shipping and then reassembled once it reaches the customer. In other examples, the seating arrangements may be configured to be disassembled for movement between locations.

Other embodiments may be considered a kit for a modular seat including rear panel, a back panel adjoining said rear panel, a base box mating with said back panel, a seat supported by said base box, and a set of removable back panel segments. The back panel segments, in this example, are placed on the back panel. The kit may also include a top cap for the back panel segments once they are hung on said back panel. The cleat system may include at least two chamfered cleats per segment to be hung, the chamfered cleats projecting from a back panel, at least two recesses in a back face of each segment where each of the two said recesses include a chamfered edge within the recess that is configured to accept and mate with the chamfered cleats to removably hang the segment. The modular seat may be shipped disassembled in kit form for assembly by a customer after shipment.

Still, in other examples a modular seating arrangement may include a rear panel, a back panel adjoining said rear panel, a base box mating with said back panel, a seat supported by said base box, and a set of removable back panel segments. The back panel segments are hung on the back panel in this embodiment. A top cap may be included for securing the back panel segments once they are hung on the back panel. The arrangement may also include a cleat system having at least two chamfered cleats per segment to be hung. The chamfered cleats may project from a back panel. There may be at least two recesses in a back face of each segment, each of the two said recesses having a chamfered edge within the recess and configured to accept and mate with the chamfered cleats to removably hang the segment. In some embodiments, the cleats may project from the back panel segments while the recesses accepting the cleats are within the back panel and structured the same as described herein.

The invention of the present disclosure may also be considered a method for a modular seating arrangement according to the embodiments disclosed.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
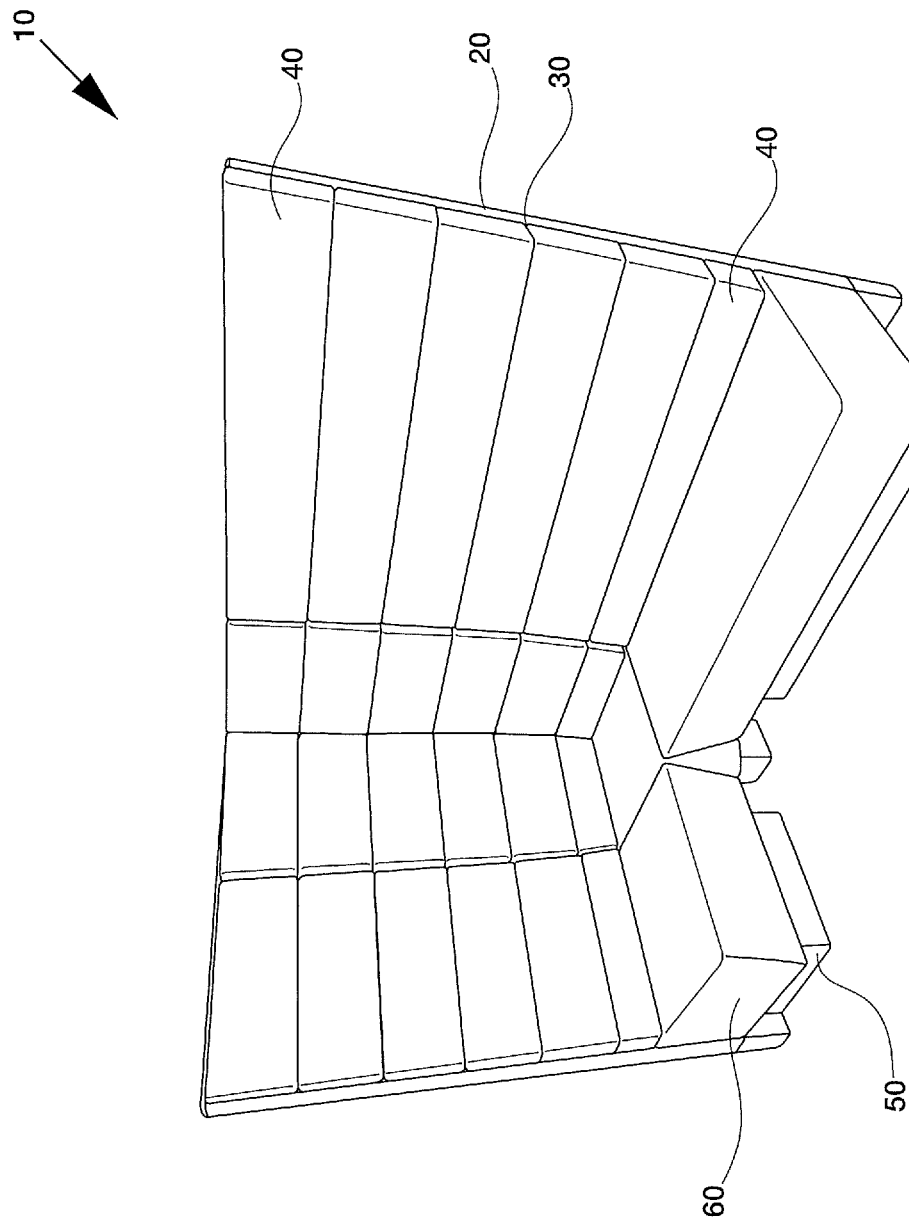
FIG. 1 is one example of a seating arrangement of the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto. FIG. 1 introduces one example of a seating arrangement 10. Seating arrangement 10, as shown in this example, is a booth seating arrangement. Any type of seating with a raised and supported back is considered within the scope of this invention.

In one embodiment of the disclosure is a seating arrangement 10 including a rear panel 20, a back panel 30 adjoining a rear panel 20, a base box 50 mating with a back panel 30, a seat 60 supported by the base box, at least one removable back panel segment 40; and a top cap 22 securing an at least one back panel segment in place.

The seating arrangement may include a cleat system 41. A cleat system 41, in one example, may include at least two cleats 32 and at least two cleat receptors 42. There may be at least two cleats 32 and/or two cleat receptors 42 in a system 41 on each back panel segment 40. The at least two cleats 32 may project from said back panel 30 to correspond to a back panel segment 40. The at least two cleat receptors 42 may be recessed into individual openings in said back panel segment 40. The cleats 32 may be angled cleats. The cleats may have a face 35 having an angle. Face 35 may be a top face. Face 35 may be non-perpendicular to the back panel 30. In some embodiments, face 35 may form an angle with the back panel of less than 90 degrees. The face 35 may be between about 75 degrees to about 25 degrees. The face 35 may be a chamfered face. A front face 39 of cleat 32 may be parallel to the back panel 30.

A back panel segment 40 may include recesses 42. The recesses 42 may include an angled edge 44. The edge 44 may be a chamfered edge 44a. The edge 44 may mate with top face 35 of an angled cleat 32.

Shipping of assembled booth type or high back bench seating can be expensive due to the size and/or the weight of the assembled piece. Such added expense can limit availability of such furniture because many customers are unwilling to adopt the shipping costs and/or unwilling to compromise on construction, durability, ease of use or design of the chair piece. In some examples, the seating arrangement is configured to be disassembled for shipping and/or gathered in a kit with a smaller footprint than the assembled piece, then reassembled or assembled for the first time, once it reaches the customer.

Figure 2:
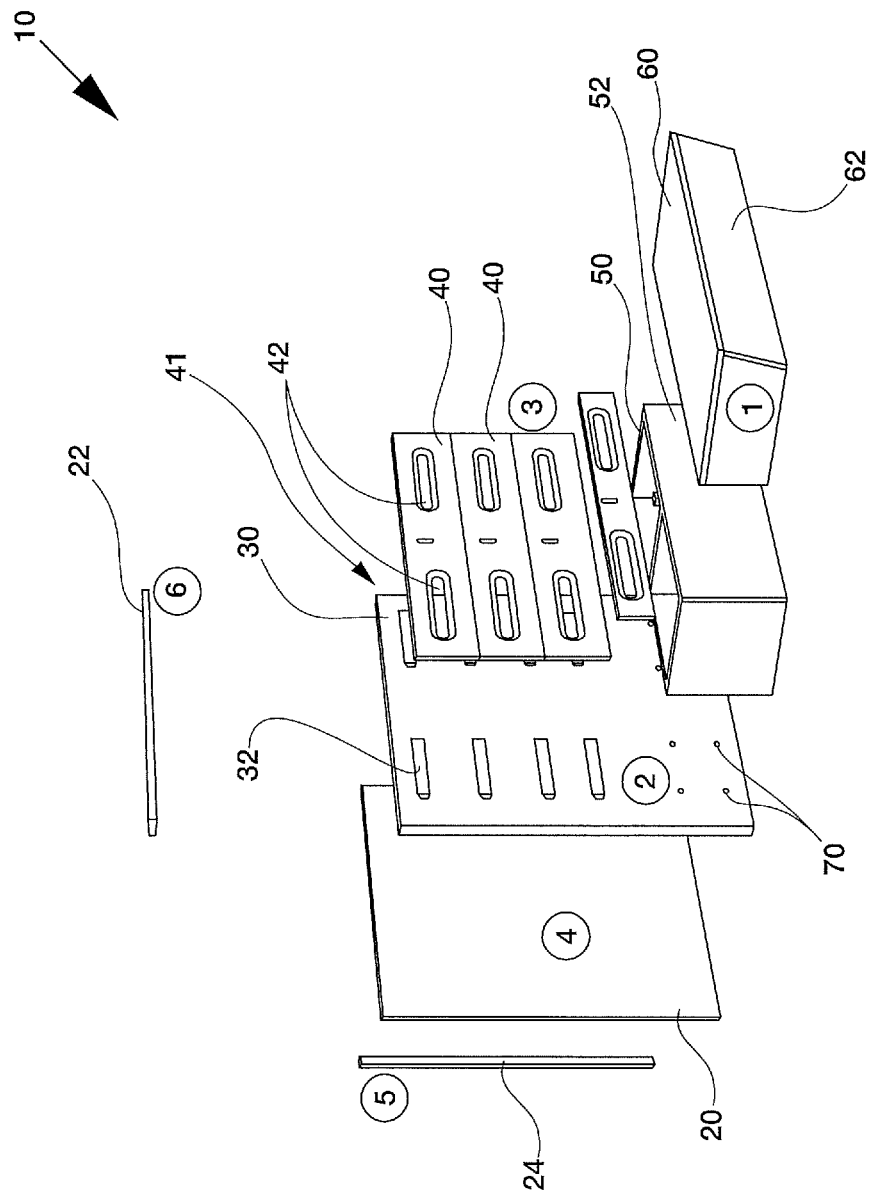
FIG. 2 is an exploded view of one embodiment of the seating arrangement of FIG. 1 according to the disclosure.
Figure 3:
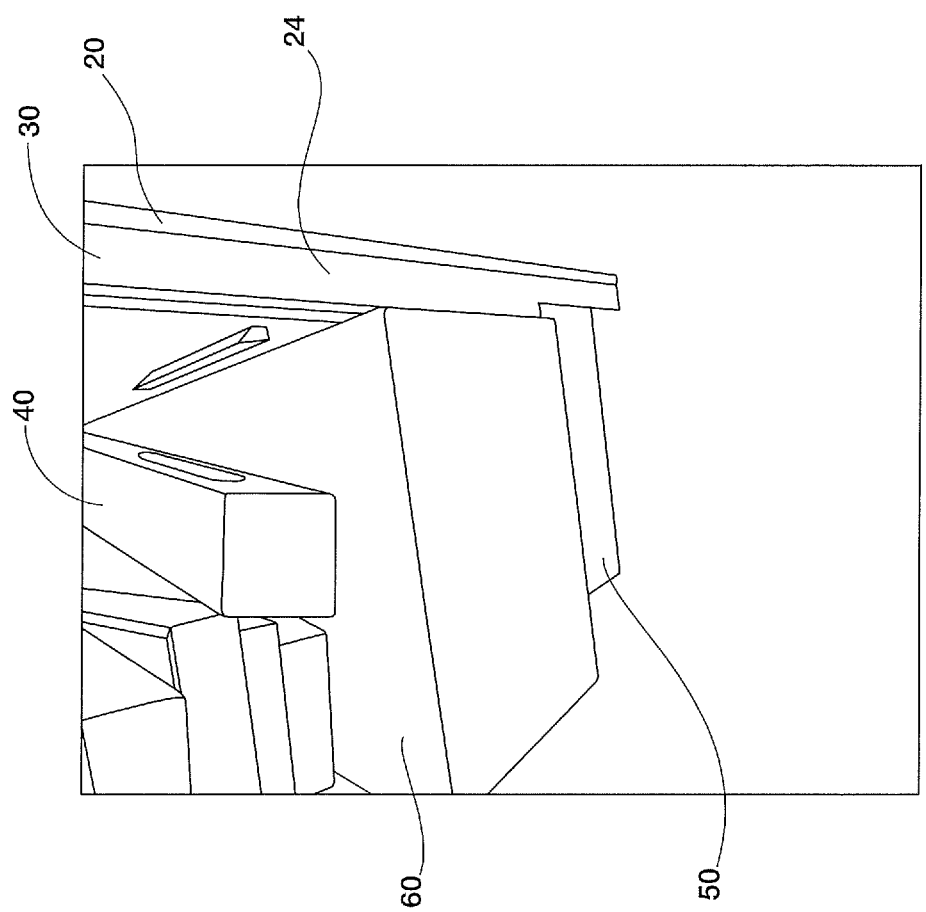
FIG. 3 is a side view of one example of a seating arrangement according to the disclosure.
Figure 4:
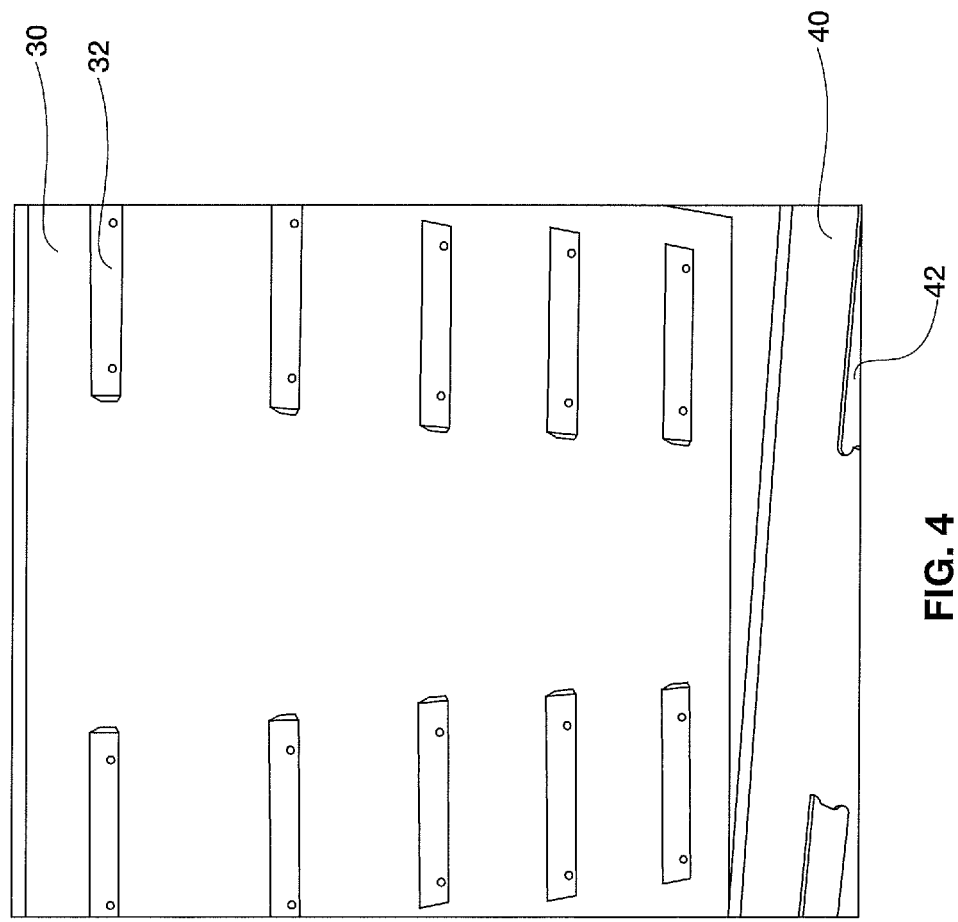
FIG. 4 is a disassembled view of one example of a portion of the seating arrangement of FIG. 1.
Figure 5:
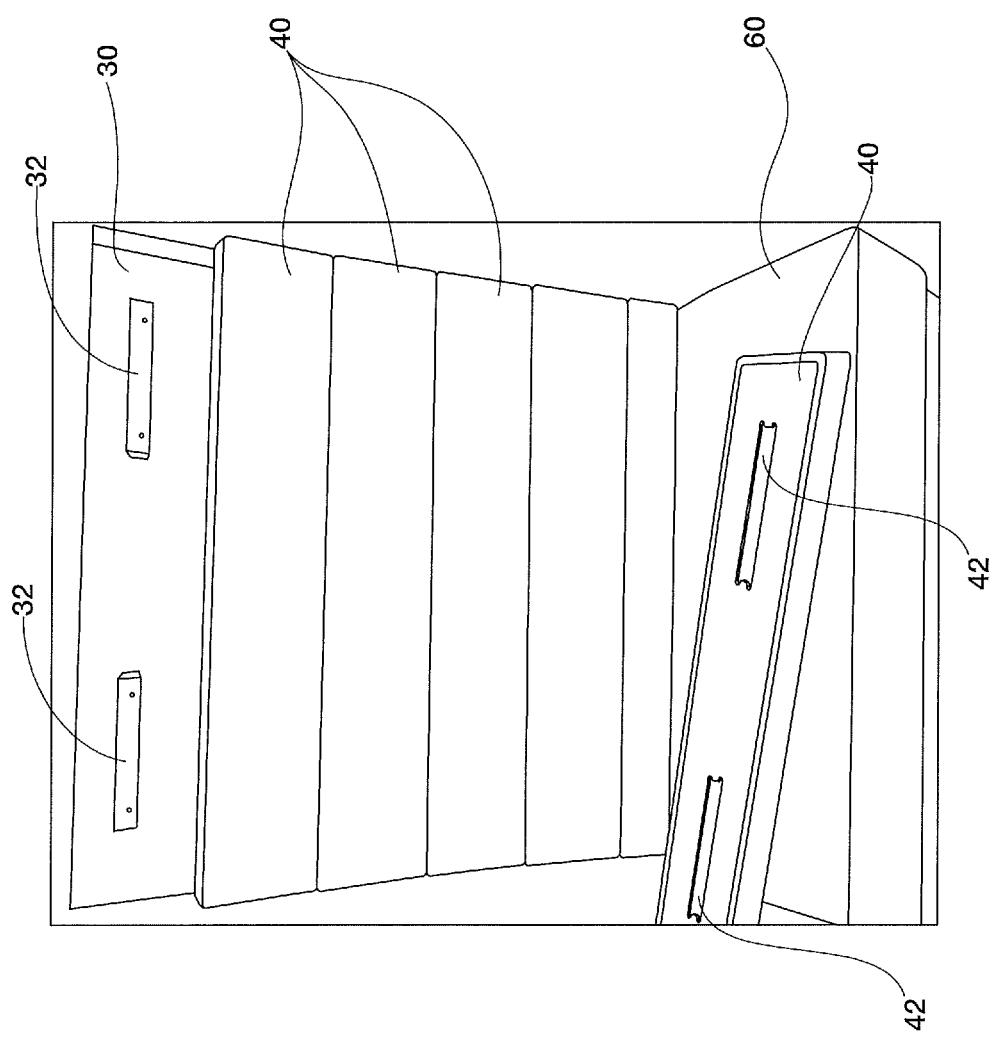
FIG. 5 is an alternate disassembled view of one example of a portion of the seating arrangement of FIG. 1.

Some embodiments, as seen for example in FIG. 2, may be considered a kit for assembling a modular seat including rear panel 20, a back panel 30 adjoining the rear panel 20, a base box 50 mating with the back panel 30, a seat 60 supported by the base box, and a set of removable back panel segments 40. The back panel segments 40, in this example, are hung on a back panel 30. The kit may also include a top cap 22 securing the back panel segments 40 once they are hung on the back panel. A cleat system 41 may include at least two chamfered cleats per segment to be hung, the chamfered cleats projecting from a back panel 30, at least two recesses in a back face of each segment where each of the two recesses 42, which may include a chamfered edge within the recess, that are configured to accept and mate with the cleats 32 top face 35 to removably hang the segment 40. The modular seat may be shipped disassembled in kit form for assembly by a customer after shipment.

Still, in other examples a modular seating arrangement may include a rear panel 20, a back panel 30 adjoining the rear panel, a base box 50 mating with a back panel 30, a seat 60 supported by a base box 50, and a set of removable back panel segments 40. The back panel segments 40 are hung on the back panel 30 in this embodiment. A top cap 22 may be included for securing the back panel segments 40 once they are hung on the back panel. The arrangement may also include a cleat system 41 having at least two chamfered cleats 32 per segment 40 to be hung. The chamfered cleats 32 may project from a back panel 30. There may be at least two recesses 42 in a back face of each segment 40, each of the two said recesses 42 having a chamfered edge within the recess and configured to accept and mate with the chamfered cleats to removably hang the segment. In some embodiments, the cleats 32 may project from the back panel segments while the recesses accepting the cleats are within the back panel and structured the same as described herein.

Figure 6:
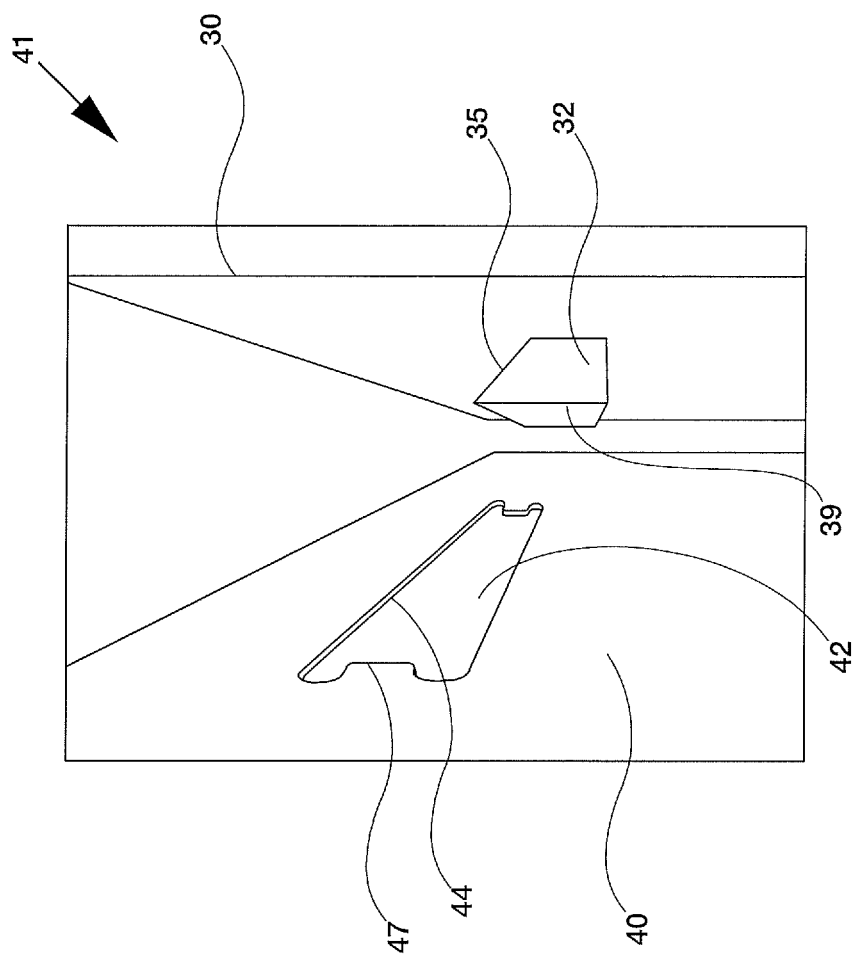
FIG. 6 is an alternate disassembled view of one example of the seating arrangement of FIG. 1, showing an example of a cleat system.
Figure 7:
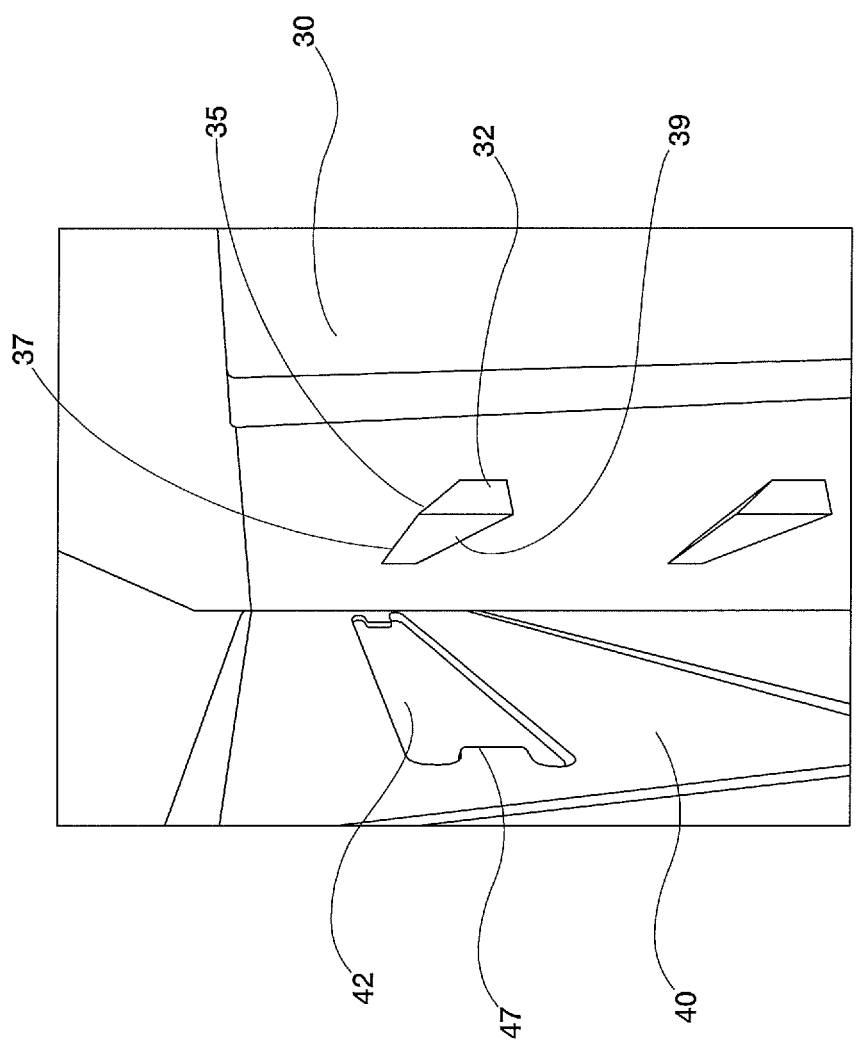
FIG. 7 is an alternate disassembled view of one example of the seating arrangement of FIG. 1 showing an example of a cleat system.
Figure 8:
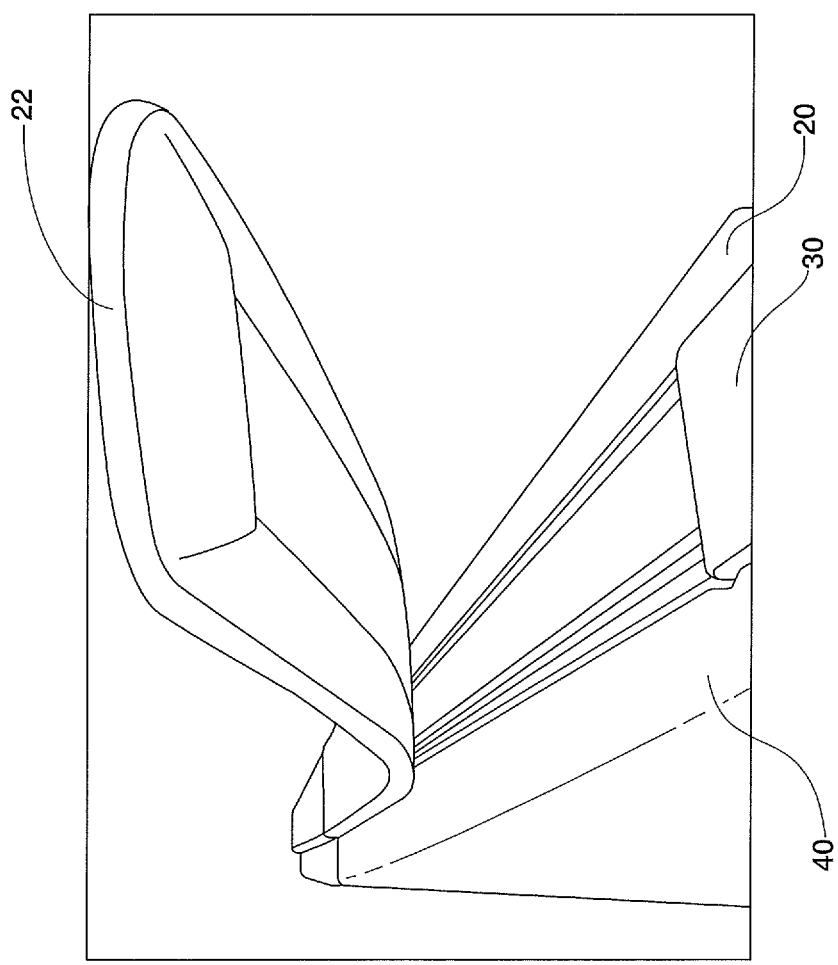
FIG. 8 is an alternate disassembled view of one example of a portion of the seating arrangement of FIG. 1, FIGS. 9-14 show various embodiments of examples of seating arrangements of the present disclosure.

FIG. 6 shows an exploded view of a cleat 32 with an angled top face 35. Recess 42 accepts cleat 32 and has an angled edge 44 corresponding to the angle of face 35 so that recess 42 accepts cleat 32 and the back panel segment 40 such that the back panel segment 40 is supported substantially flush against back panel 30. A tension is formed, in some examples, between adjacent back panel segments to assist in preventing a back panel segment 40 from lifting off of the portion of the back panel 30 to which it is secured. Inside a recess 42 it is chamfered to a 45 degree angle cleat as a mirror image 45 degree chamfered edge.

The cleat system 41 may include an angle of between about 20 and about 70 degrees. In some examples, the angle may be about 45 degrees. The cleat system enables the clamping tension of stacked panels, for example of between 2 to about 14, or more back panel segments 40 to provide position pressure to hold the back panels tightly to the back panel 30. Upholstery gaps between assembled chair parts may be reduced or removed altogether by the application of the tension between the panel segments 40. The top cap 22 may be affixed to hold the back panel assembly in place without the use of other fixture devices such as clamps, screws, etc. The top cap 22 may secure the segments 40 in touching alignment vertically to maintain the tension between the panel segments 40. The use of two cleats per panel may also serve as an indexing system, keeping the panels centered horizontally while being assembled. The panel segments are both thereby centered and fixed to the back. A positioner 47 may be included on one or both ends of recess 42 to align the cleats 32 within the recess 42. Positioners may be, in some examples, an inward projection into the recess 42, projecting from the perimeter from each end of the recess. Positioner 42 may include a securing face. Positioners 47 may also provide a horizontal tension to keep the panel segments 40 in alignment with one another and centered on the seating arrangement when assembled.

Top cap 22, when placed on top of the top portion of the adjoining panel segments 40 maintains the tension and secures the back panels in place. In one example, the top cap 22 may be secured by any means, by way of example, hammered down with a soft mallet, secured by way of nails, attached with adhesive, and or by way of screws.

The invention of the present disclosure may be considered a method for a seating assembly. In one embodiment, in use and as assembled as seen in FIG. 2, a method may include affixing a seat 60 on base box 50; attaching a back to a base box, for example utilizing bolts; attaching panel segments to cleats on a back board; affixing a back panel 30; attaching side caps 24; attaching a top cap 22.

Figure 11:
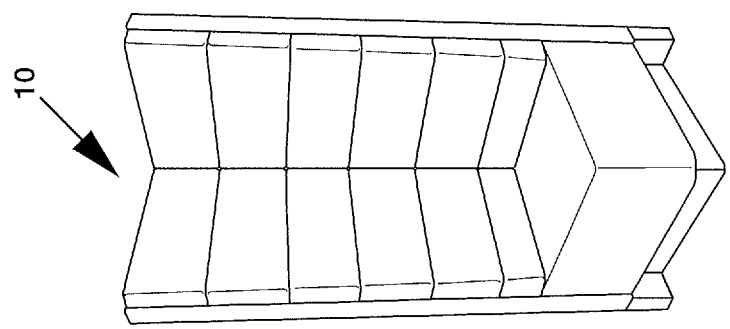
Figure 10:
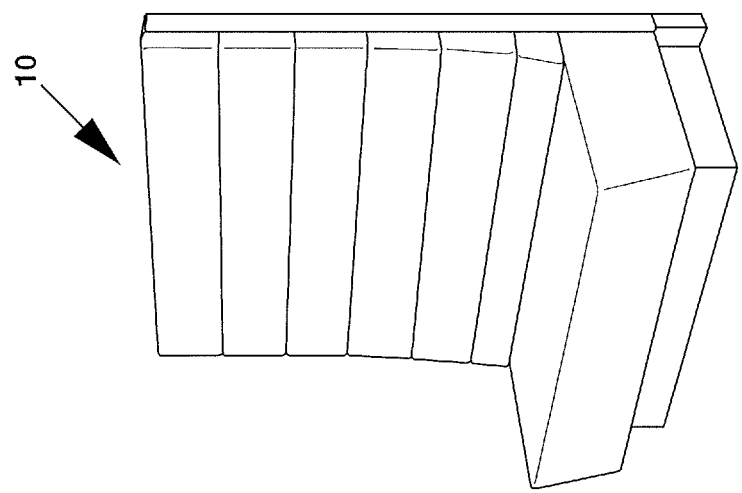
Figure 9:
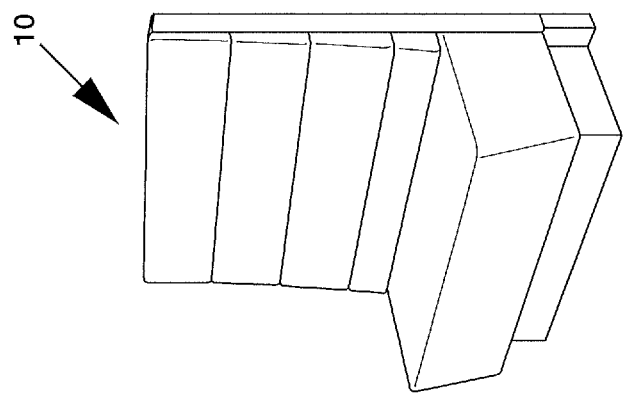
Figure 12:
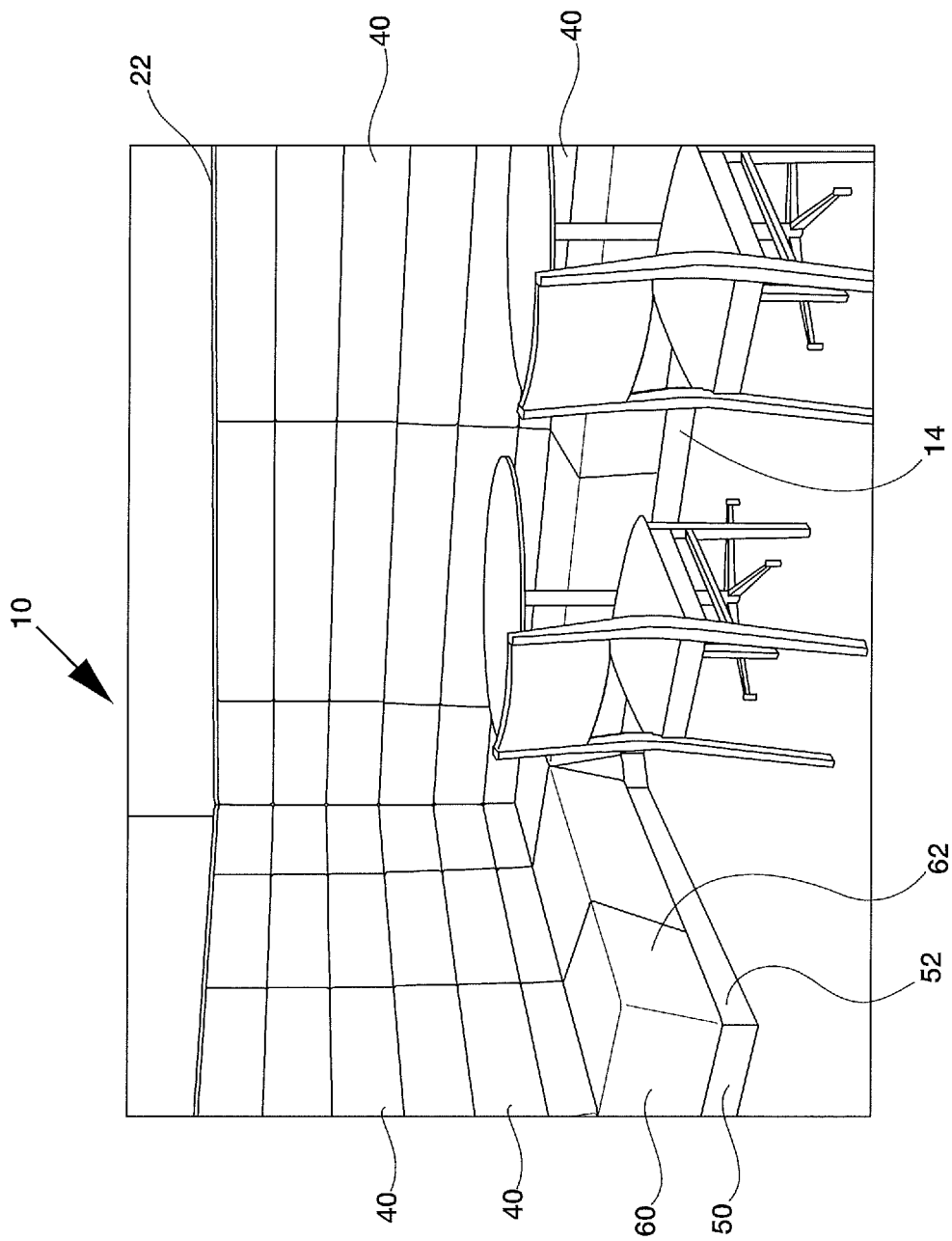
Figure 13:
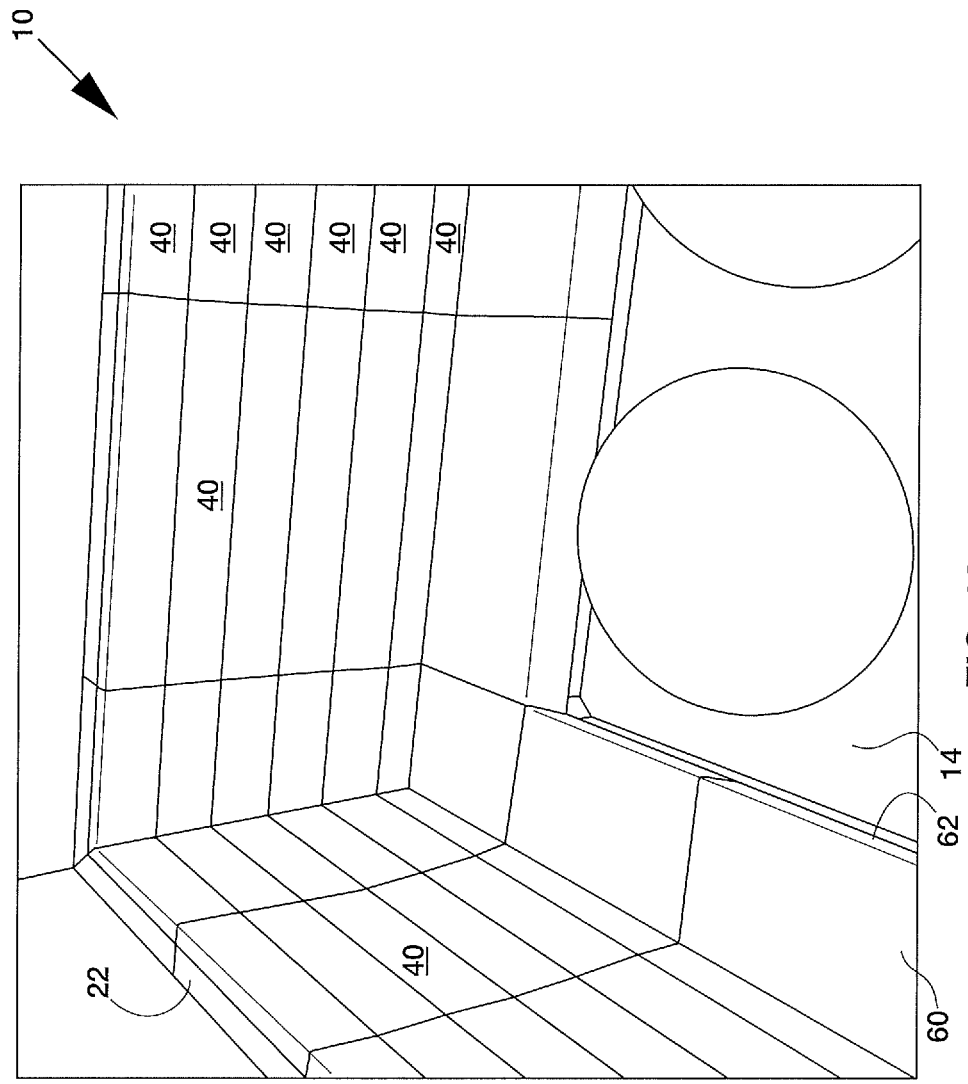
Figure 14:
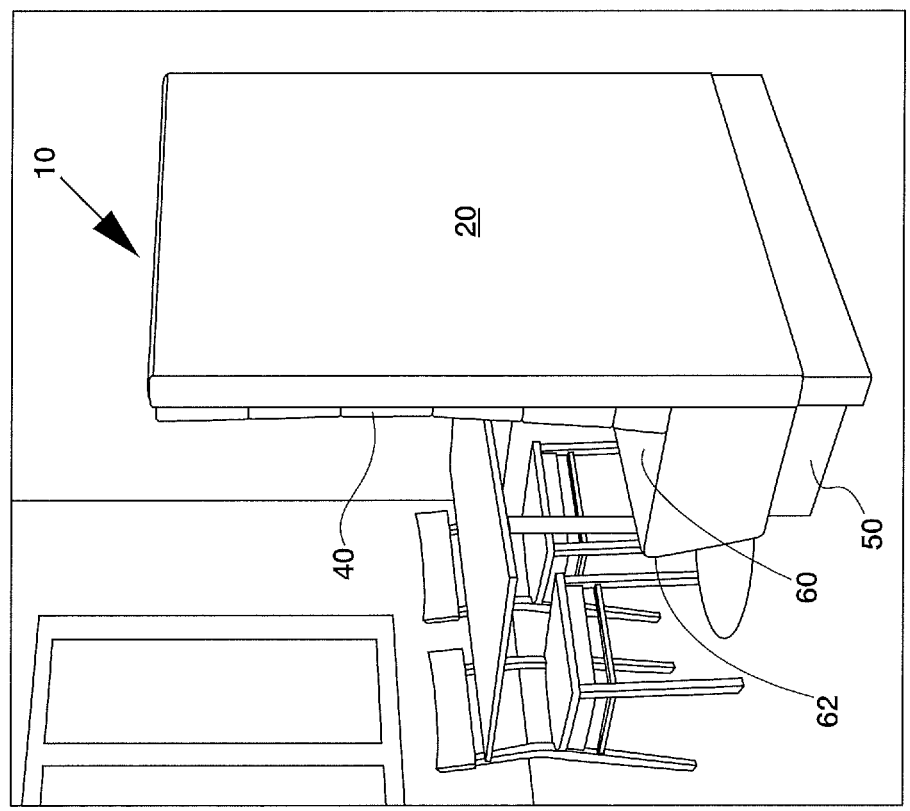

The seating arrangement may be a seating system including more than one configuration of seating arrangements, for example, as seen in FIGS. 12-14. Example dimensions and arrangement variations, as may be seen in FIGS. 9-11, by way of example may be: of a width between 24" to 50", depth of about 20" to about 26", and a height of between 40" to 70" and in some examples 48" to 66". Dimensions of seating arrangements shown are exemplary and dimensions may vary with the scope of the disclosure including other seating dimensions as well.

Figure 15:
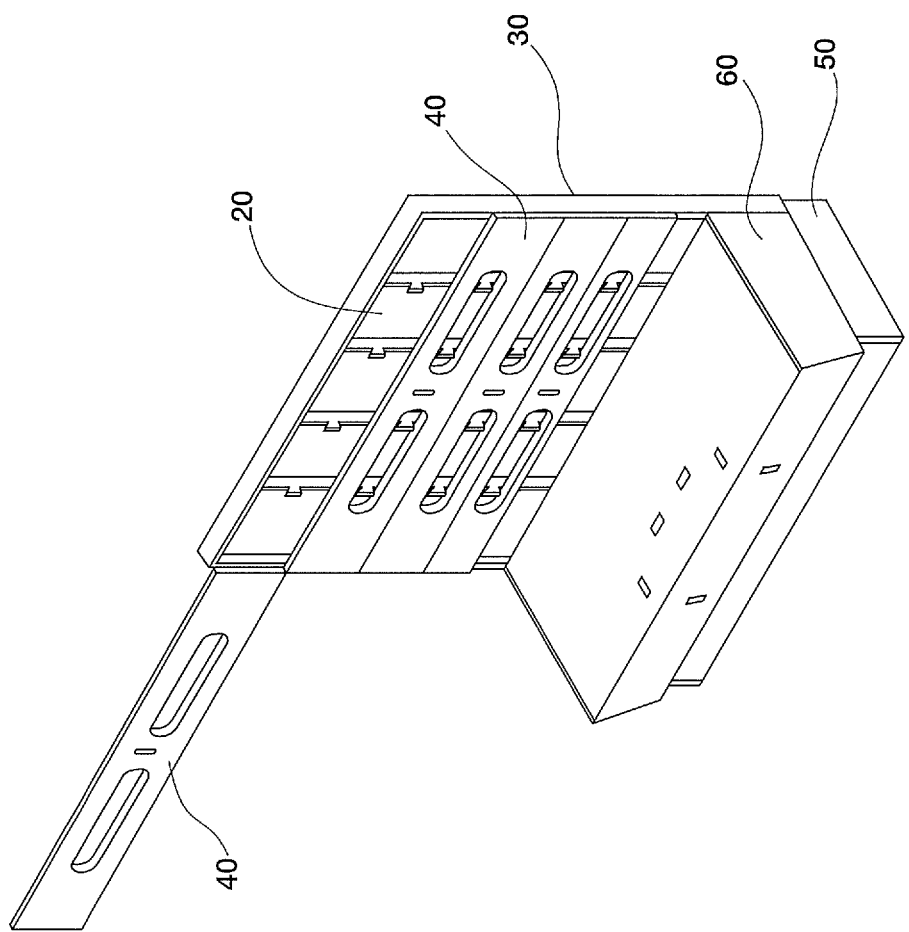
FIG. 15 is another example of a seating arrangement of the present disclosure.
Figure 16:
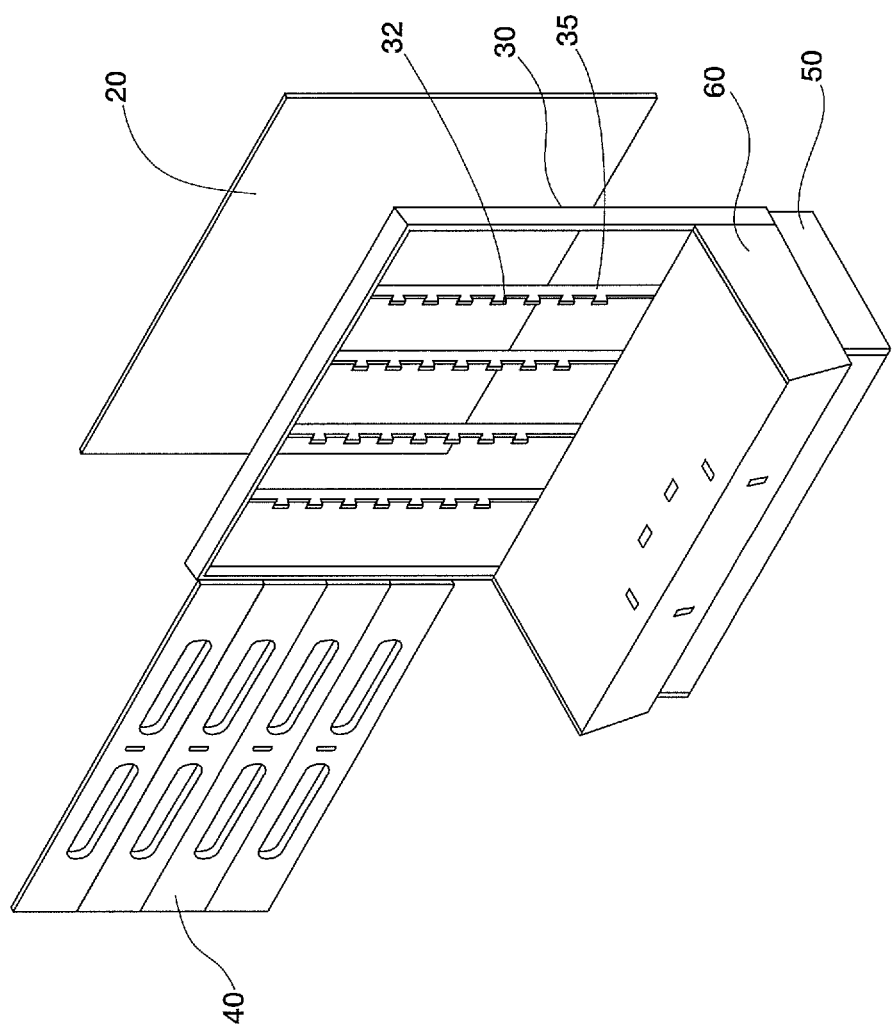
FIG. 16 is a side perspective view of an example of the seating arrangement of FIG. 15, and FIGS. 17-19 are exploded views of examples of the seating arrangement of FIG. 15, showing embodiments of a cleat system.

FIGS. 15 and 16 show yet another embodiment of arrangement 10. Cleats 32 may be integrally formed with back panel 30. Back panel 30 may include vertical supports 31. The inner vertical supports 31 may include cleats 32 while the outer vertical supports 31 may not.

Figure 17:
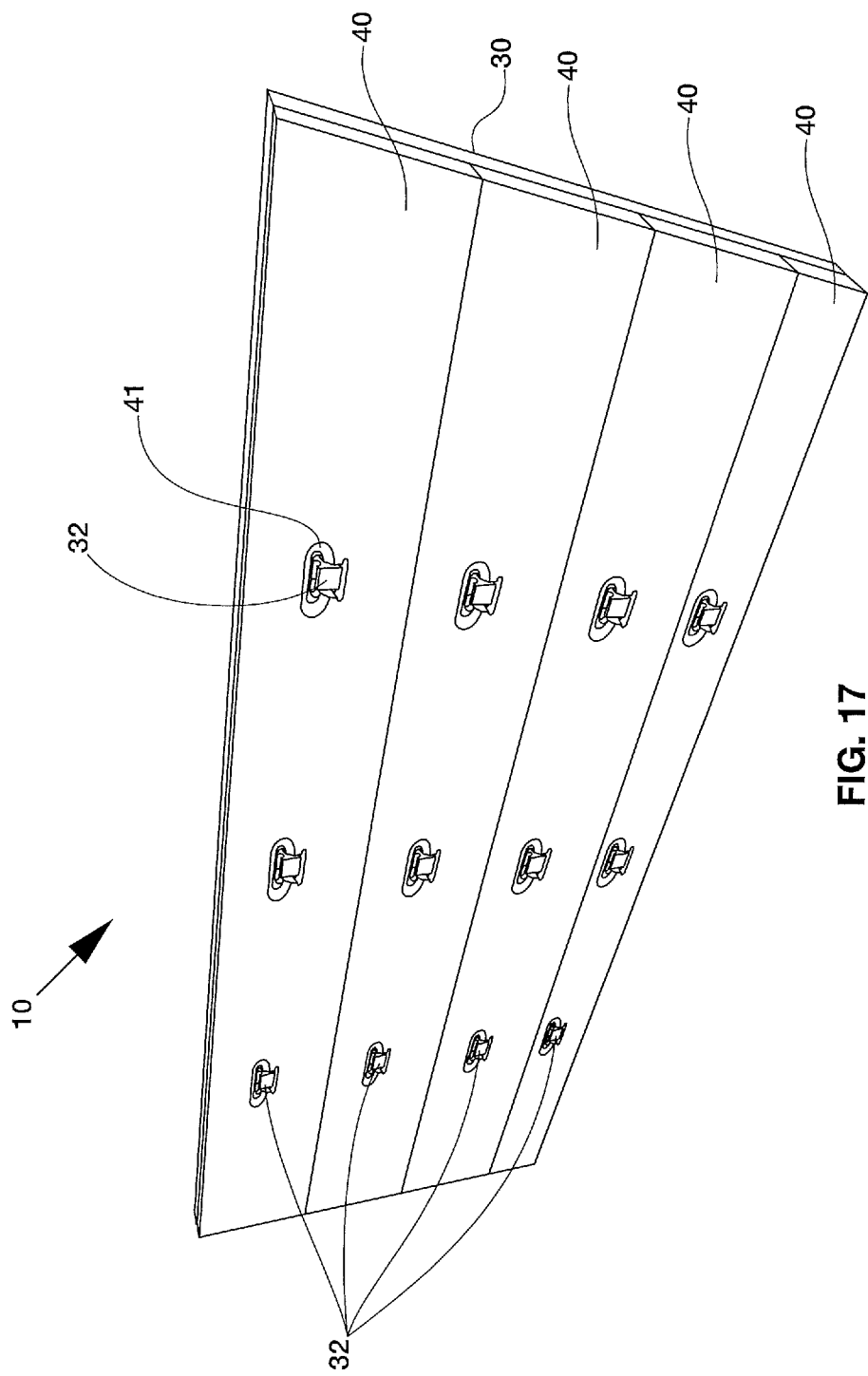
Figure 18:
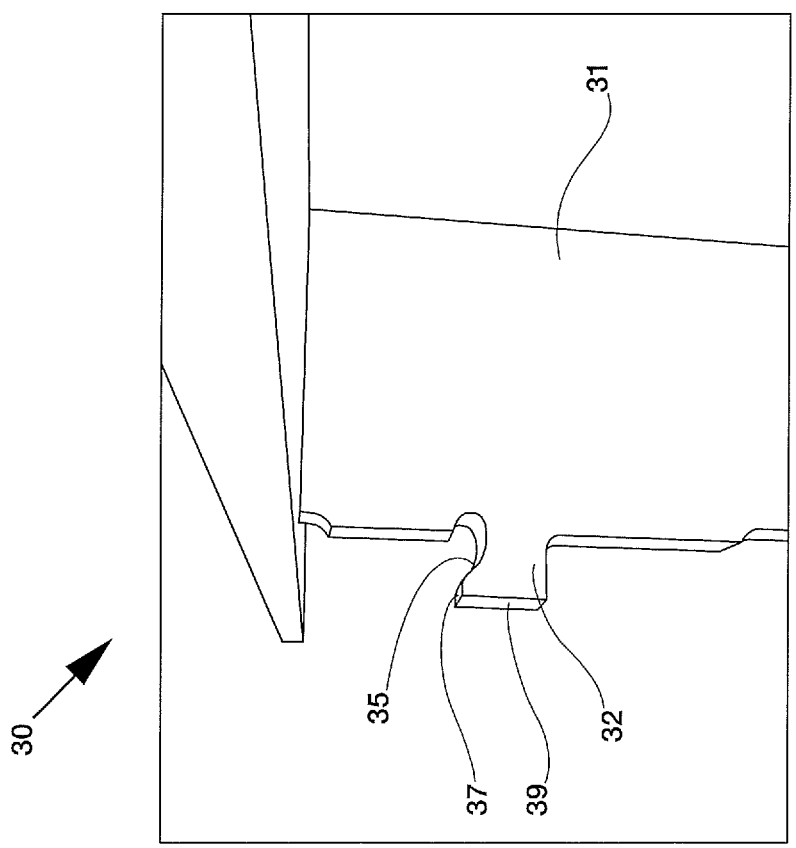
Figure 19:
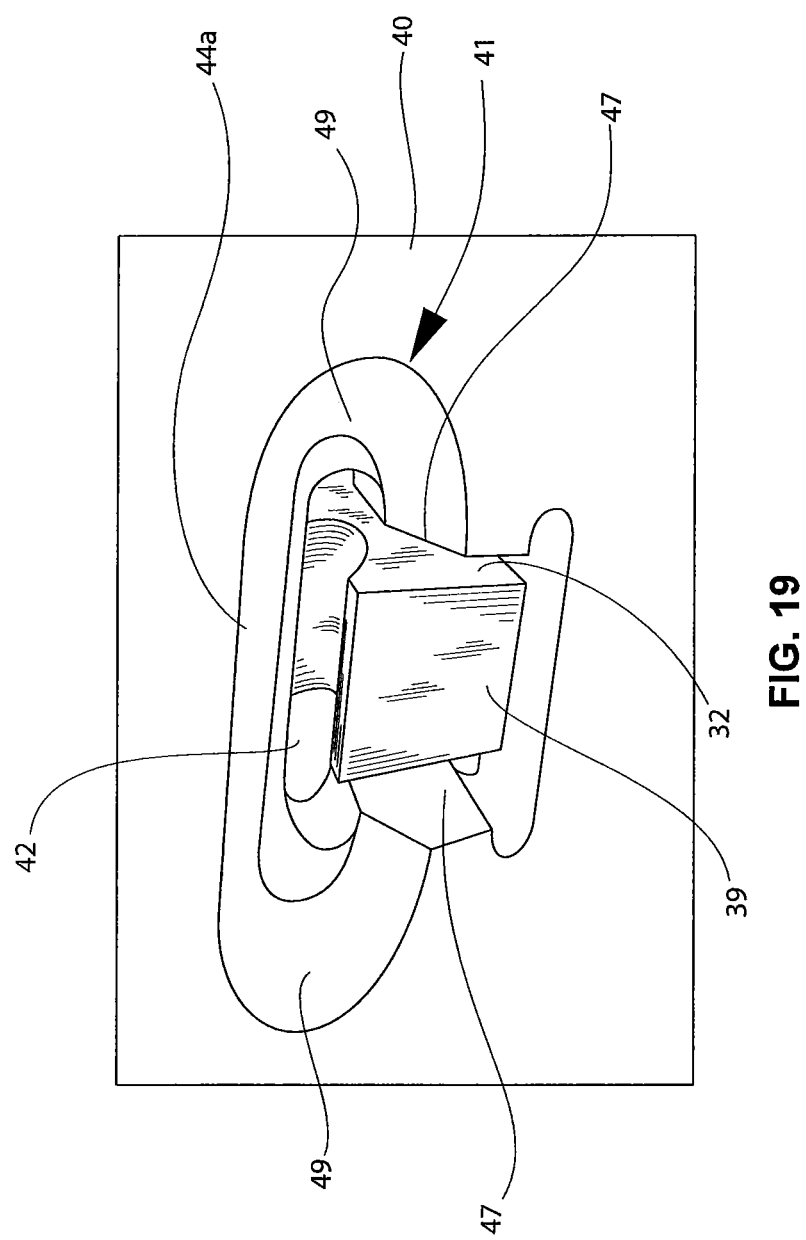

In some embodiments, as shown in FIGS. 17-19, the arrangement 10 may include a cleat system having cleats integral with vertical supports 31, the cleats mating with recesses 42 on panel segments 40. The cleats 32 may include a top face 35 that is angled with a curvature, terminating at a peak 37. The peak may include a substantially horizontal portion. Vertical support 31 may include a non-vertical indentation between face 35 and support 31 at the junction of the two. The indentation may be curved.

The recess 42 may be a curved recess having oblong wings 49. The recess 42 may serve as a cleat receptor. The curved recess may include an angled edge on the side of the panel segment 40 facing away from the back panel 30, allowing a flush meeting of the panel portions and back panel. A top of the recess 42 may be accommodated by and fit into the indentation between face 35 and support 31. The recess may be a keyhole recess with an upper portion having curved wings on each side of the upper portion and a lower portion having smaller curved wings on each side of the lower portion. Ends 47 may be perpendicular to the back panel and configured to align the cleat 32 in the recess 32 securely. The ends 47 may be configured to provide alignment for each panel segment 40 and between the panel segments/portions 40.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:
1. A seating arrangement comprising:
a. a rear panel,
b. a back panel separable from said rear panel but adjoining said rear panel;
c. a base box separable from said back panel but mating with said back panel;
d. a seat supported by said base box and enclosing a top portion of said base box;
e. at least two one removable back panel segments hung in an adjacent position on the back panel in such a way that a tension is formed between the adjacent back panel segments to assist in preventing a back panel segment from lifting off of the portion of the back panel, the back panel segments held in position by arrangement of the parts when a top cap is attached; and
f. the top cap securing said the at least two back panels vertically, wherein the top cap maintains the tension on the at least two removable back panel segments without the use of other fixture devices on the at least two removable back panels panel.

2. The seating arrangement of claim 1 including a cleat system configured to removably secure said back panel segment to said back panel.

3. The seating arrangement of claim 2 wherein said cleat system includes at least two cleats and at least two cleat receptors.

4. The seating arrangement of claim 3 wherein said at least two cleats project from said back panel to correspond to a back panel segment.

5. The seating arrangement of claim 4 wherein said at least two cleat receptors are recessed into openings in said back panel segment.

6. The seating arrangement of claim 5 wherein said at least two cleats are angled cleats, wherein an angle extends outwardly away from said back panel.

7. The seating arrangement of claim 6 wherein said angled cleats have an angle of between about 21 degrees to about 70 degrees.

8. The seating arrangement of claim 6 wherein said angle is about 45 degrees.

9. The seating arrangement of claim 8 wherein said openings in said back panel segment recesses include an angled chamfered edge to mate with said at least two angled cleats.

10. The seating arrangement of claim 9 wherein said angled chamfered edge includes an angle of about 45 degrees.

11. The seating arrangement of claim 10 wherein said recesses center said back panel segment on said back panel horizontally.

12. The seating arrangement of claim 11 wherein said cleat system centers and secures said back panel segment vertically on said back panel.

13. The seating arrangement of claim 12 including at least 4 back panel segments stacked along and secured to said back panel by way of said cleat system.

14. The seating arrangement of claim 13 wherein said seating arrangement is configured to be disassembled for shipping and then reassembled once it reaches the customer.

15. The seating arrangement of claim 10 including at least one side cap.

16. The seating arrangement of claim 15 wherein said arrangement is a corner seating arrangement.

17. The seating arrangement of claim 16 wherein said arrangement is a wall seating arrangement.

18. A kit for assembling a modular seat, comprising:
a. rear panel,
b. a back panel for adjoining said rear panel;
c. a base box for mating with said back panel;
d. a seat configured to be supported by said base box;
e. a set of removable back panel segments, wherein said back panel segments are configured to be hung on said back panel;
f. a top cap for securing said back panel segments once they are hung on said back panel, wherein the top cap constrains and secures the set of removable back panel segments in place vertically in a touching alignment so that they are held in position and not removable until the constraint maintained by the top cap is removed;
g. a cleat system having at least two chamfered cleats per segment to be hung, said chamfered cleats projecting from said back panel, and
h. at least two recesses in a face of each segment, each of the two said recesses having a chamfered edge within said recess configured to accept and mate with said chamfered cleats to removably hang said segment,
i. wherein said modular seat is shipped disassembled in kit form for assembly by a customer after shipment.

19. A modular seating arrangement comprising:
a. a rear panel,
b. a back panel adjoining said rear panel;
c. a base box mating with said back panel;
d. a seat supported by said base box;
e. a set of removable back panel segments, wherein said back panel segments are configured to be hung on said back panel and each of said panels in the set of removable back panel segments extends from one end of said back panel to the other end of said back panel horizontally;
f. a top cap configured to secure said back panel segments once they are hung on said back panel the back panel segments constrained and held in position by arrangement of the parts when the top cap is secured;
g. a cleat system having at least two chamfered cleats per segment to be hung, said chamfered cleats projecting outwardly away from said back panel, and
h. at least two recesses in a face of each segment, each of the two said recesses having a chamfered edge within said recess configured to accept and mate with said chamfered cleats to removably hang said segment.

20. The arrangement of claim 19 including vertical ends in said recess configured to align said cleats within said recess.

* * * * *